US005748876A

United States Patent [19]

Hardy

[11] Patent Number: 5,748,876
[45] Date of Patent: May 5, 1998

[54] SYSTEM AND METHOD FOR TESTING ACOUSTIC MODEMS WITH SEMANTICALLY ENCODED WAVEFORMS

[75] Inventor: William Christopher Hardy, Dallas, Tex.

[73] Assignee: MCI Communications Corporation, Washington, D.C.

[21] Appl. No.: 580,743

[22] Filed: Dec. 29, 1995

[51] Int. Cl.[6] .................................................. H04M 1/64
[52] U.S. Cl. ................ 395/183.01; 364/553; 364/266.4; 371/20.4
[58] Field of Search .................... 364/514 B, 553, 364/921.8, 551.01, 802, 919, 222.2, 222.3, 919.4, 226.8, 265, 265.1, 266.2, 266.4; 371/5.1, 5.5, 6, 20.1, 20.4, 20.5; 379/1, 21, 13, 27, 26, 22, 24, 6; 395/183.01, 183.02

[56] References Cited

U.S. PATENT DOCUMENTS

| | | |
|---|---|---|
| 3,819,878 | 6/1974 | Pine et al. . |
| 4,001,559 | 1/1977 | Osborne et al. . |
| 4,064,459 | 12/1977 | Markwitz et al. . |
| 4,129,756 | 12/1978 | Depouilly et al. . |
| 4,247,934 | 1/1981 | Parras . |
| 4,351,059 | 9/1982 | Gregoire et al. ........................... 375/10 |
| 4,534,043 | 8/1985 | Krishan . |
| 4,606,044 | 8/1986 | Kudo . |
| 4,660,194 | 4/1987 | Larson et al. . |
| 4,766,594 | 8/1988 | Ogawa et al. . |
| 5,163,051 | 11/1992 | Biessman et al. . |
| 5,274,697 | 12/1993 | Schroeder et al. ........................ 379/98 |
| 5,448,624 | 9/1995 | Hardy et al. . |

OTHER PUBLICATIONS

Modulator-Demodulator, Yukikazu et al., Mar. 27, 1989, abstract.
Subscriber-Communications Channel Interface, Dubovitski et al., 1989, Abstract.
Telephone Communication Quality Test, Omron KK, 1993.
Multi-Rate Binary Data Transmission System, Gonnet et al., 1995 Abstract.
"Artificial Voices," *Proc. of the CCITT Plenary Assembly; Blue Book*, vol. 5, pp. 87–99, Nov. 14–25, 1988, Melbourne.

Primary Examiner—Emanuel T. Voeltz
Assistant Examiner—Craig Steven Miller

[57] ABSTRACT

A system and method that produces an acoustic waveform representing a semantically encoded modem waveform, transmits the acoustic waveform over an operational telephone line to a destination location, and records the transmitted acoustic waveform at the destination location. Semantic bit errors are identified at the destination and segments of the recorded acoustic waveform that corresponds to the semantic bit errors are isolated. The isolated segments of the recorded acoustic waveform are compared to corresponding segments of an ideal acoustic waveform to identify waveform distortions. The waveform distortions are then characterized as circuit component effects of the operational telephone line.

10 Claims, 4 Drawing Sheets

SYSTEM AND METHOD FOR TESTING ACOUSTIC MODEMS WITH SEMANTICALLY ENCODED WAVEFORMS

BACKGROUND OF THE INVENTION

1. Field of the Invention

The field of the invention relates generally to communications of data over telephone lines by use of modems, and more particularly, to a system and method for testing modem telephony with semantically encoded waveforms.

2. Related Art

Modems are used to relay data over telephone networks and have become an integral part of commercial and residential computer systems. As demand grows for faster access to information and inter-computer communications, so does the demand for faster, more efficient modems.

Modems are usually sold with various controls and firmware necessary to maintain a data transmission in accordance with established industry protocols. Standard manufacturer acoustic modem packages include software for user specification of calls and initial dialing, and hardware embedded routines for handshaking to establish transmission links. Some data and facsimile (fax) modems use error correction codes (ECC) to detect and correct errors during data transmission. If error thresholds are surpassed, most high-speed modems (e.g., 14.4 or 28.8 kilo bits per sec (kbps)) are capable of stopping data transmission, training-down to a slower transmission rate to reduce errors, and restarting data transmission. In fact, today's high speed modems usually do not operate at their peak transmission rates because of noisy telephone lines.

Modem performance is conventionally measured by monitoring error rates during transmission over telephone lines. For example, during design and testing of new modems, manufactures test error rates under various circuit conditions. This type of testing yields the accuracy of the transmission rates attempted. However, this type of testing does not uncover information concerning the relationship between circuit conditions, the errors they produce, and subsequent training-down of the transmission rate.

What is desired is a technique to understand what causes modems to perform as they do in operational environments. To achieve this goal, it is necessary to determine the ability of modems to maintain an accurate exchange of data under operational (i.e., real world) circuit conditions.

SUMMARY OF THE INVENTION

The present invention is directed to a system and method to test operational telephone lines and to measure, for example, certain characteristics by transmitting known signals, receiving the signals and later analyzing the waveforms of the received signals. Thus, the present invention is directed to a technique for determining what causes transmission errors.

The method of the present invention evaluates waveform distortions without using actual modems to test integrity of the operational telephone lines. The method comprises emulation of modem transmissions by construction and transmission of a waveform representing that which would be generated by a modem. The emulated waveform is a function of input semantic content and the coding techniques used to convert that semantic content into analog waveforms. The emulated analog waveform is transmitted over operational telephone lines and is recorded at the destination.

The method of the invention correlates recorded acoustic waveform to isolate waveform distortions that cause semantic errors. The method of the invention compares a known acoustic waveform (i.e., a waveform without any distortion caused by transmission), with a recorded acoustic waveform transmitted over an operational telephone line to determine components of distortion on the recorded acoustic waveform. This provides an understanding of what direct effects the transmission has on modem performance.

The method can be performed in a repeated fashion over different operational telephone lines and/or subsystems to generate a comprehensive data set. The data set can be statistically analyzed using conventional techniques. The results can then be used for modem or operational telephone line diagnostics.

Additionally, the present invention can be used to develop new techniques to avoid training-down of transmission rates that is prevalent in current high speed modems, thus improving transmission efficiency.

A feature of the present invention is its applicability to test networks used for modem communications.

A further feature of the present invention is that it yields information concerning circuit characteristics that limit modem transmission rates. This information can be used to set standards for networks used for modem communications.

Similarly, information about what distortions are present can be used to diagnose and/or repair networks used for modem communications.

A still further feature is that statistics of distortion and resultant transmission errors correlated according to the present invention can be used to develop real-time modem diagnostic algorithms. Results gathered using the invention can be used to design modems that are less prone to errors or automatically compensate for recognized distortion.

BRIEF DESCRIPTION OF THE FIGURES

The present invention will be described with reference to the accompanying drawings, wherein.

The preferred embodiment of the invention is described below with reference to these figures where like reference numbers indicate identical or functionally similar elements. Also in the figures, the left most digit of each reference number corresponds to the figure in which the reference number is first used.

DETAILED DESCRIPTION OF THE PREFERRED EMBODIMENTS

The present invention permits evaluation of the waveforms and correlating the waveforms to the error rate as a function of the voice circuit path (i.e., an "operational telephone line") characteristics. By comparing a known waveform, i.e., a waveform without any distortion caused by transmission, with a waveform transmitted over an operational telephone line, components of distortion on the recorded waveform can be isolated.

According to the techniques of the present invention, the causes of transmission errors can be minimized in operational telephone lines. The performance of modems as a function of operational telephone lines is impacted by many factors. Some of these factors include signal power loss, distortion caused by noise and digital-to-analog (D/A) and A/D quantizing effects, echo path loss and echo path delay. According to the present invention, these factors can be detected by comparing a recorded acoustic waveform with an ideal acoustic waveform. Once isolated and statistically analyzed, this information can be used to repair known circuit components in the operational telephone line, because the types of distortions in the waveforms are highly correlated with their sources.

Figure 1:
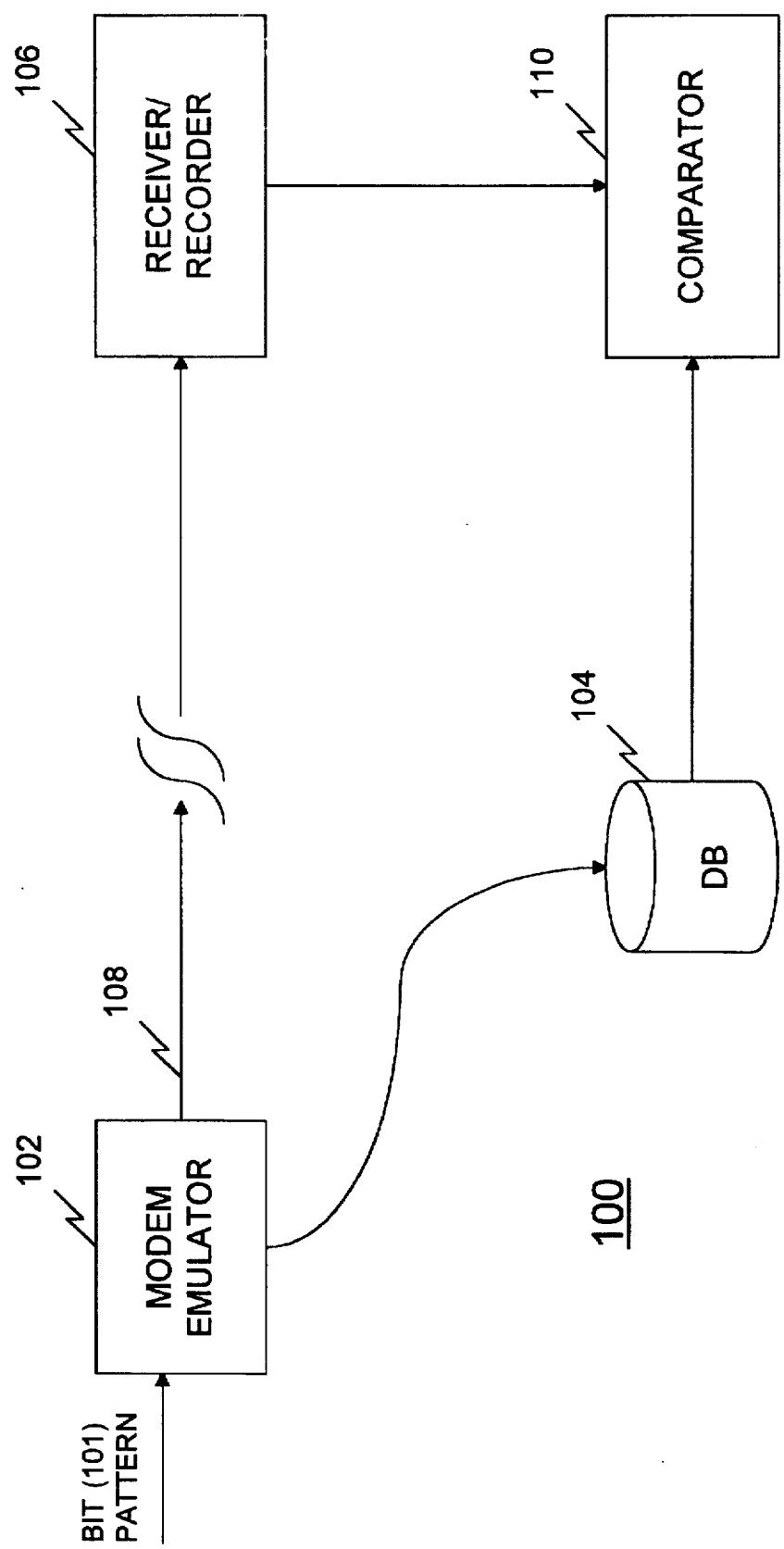
FIG. 1 shows a high-level block diagram of a system for testing semantically encoded modem waveforms, according to a preferred embodiment of the present invention.

An exemplary system for implementing the present invention is illustrated in FIG. 1. A modem emulator 102 is used to produce an acoustic waveform having semantic content that is a combination of pre-selected bit patterns 101. A digital copy of the acoustic waveform of the pre-selected bit patterns 101 is stored in a database 104. The acoustic waveform, which represents the signal that a modem would ordinarily produce based on the bit patterns 101, is preceded by a synchronization signal and transmitted to a receiver/recorder 106 via an operational telephone line 108 of a conventional telephone network. The transmitted acoustic waveform and synchronization signal are recorded at a destination location by receiver/recorder 106.

A comparator 110 is used to analyzed and compare the recorded acoustic waveform to a copy of the original acoustic waveform (e.g., an "ideal" acoustic waveform) stored in the database 104. The comparator 110 uses the synchronization signal to properly align the recorded acoustic waveform and the ideal acoustic waveform for the comparison. The synchronization signal need only be sufficient to accurately align the recorded acoustic waveform and the ideal acoustic waveform. The format of the synchronization signal is not material to implementation of the present invention, and would be apparent to a person skilled in the relevant art.

Figure 2:
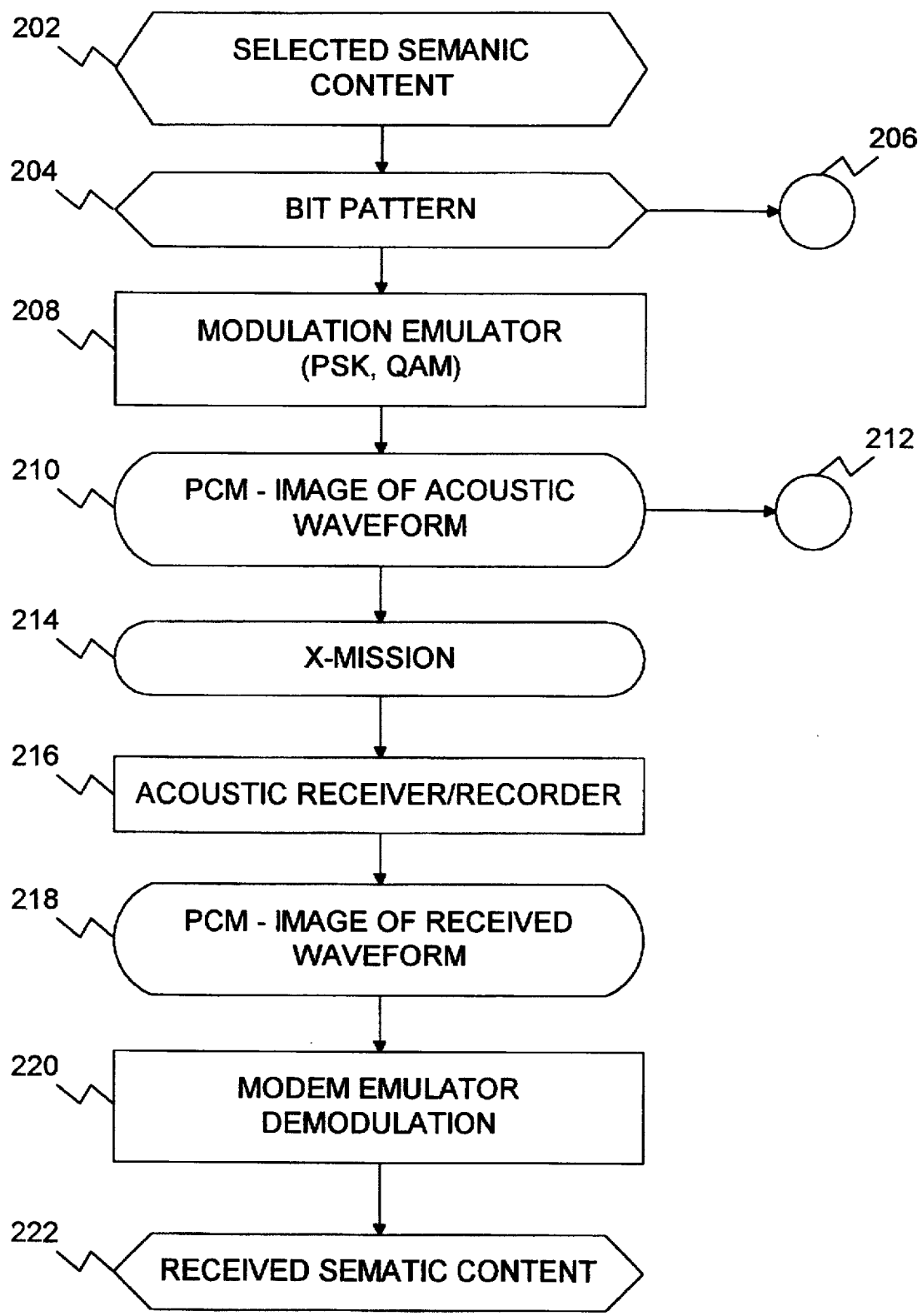
FIG. 2 shows a flowchart for collection of acoustic waveform information, according to a preferred embodiment of the present invention.
Figure 3:
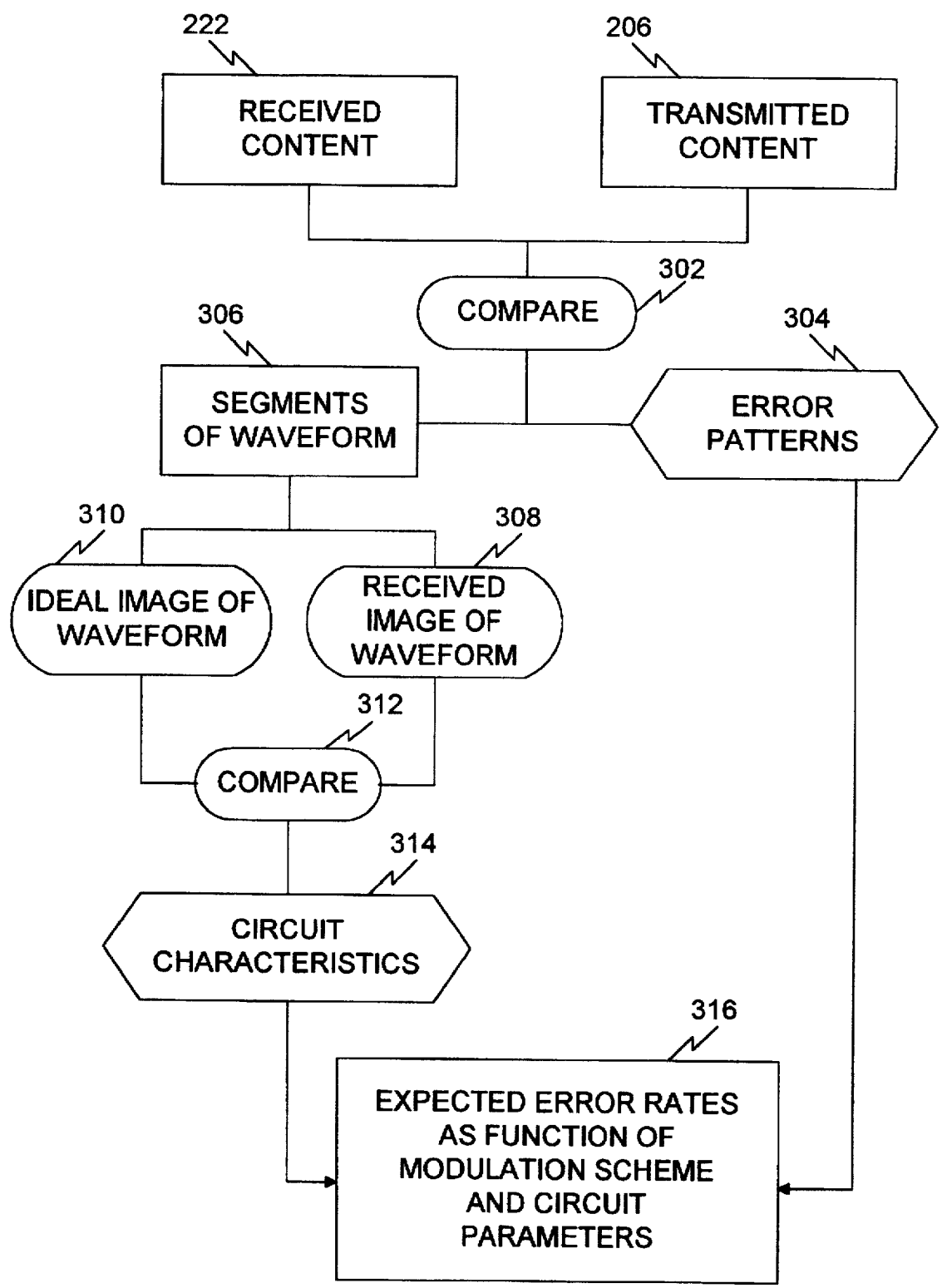
FIG. 3 shows a flowchart for processing of the information collected according to the method of FIG. 2.

The method of the present invention will now be described in connection with FIGS. 2 and 3. The flowchart of FIG. 2 illustrates the collection of acoustic waveform information in connection with the present invention. The flowchart of FIG. 3 represents the processing of the collected information.

A preferred embodiment of the collection operation begins with the selection of semantic content, as shown at a step 202. The semantic content is represented as a bit pattern, as shown at a step 204, which can be stored in the database 104 for use during the processing operation discussed below in connection with FIG. 3. The storing of the bit pattern in the database is shown generally at 206.

The bit pattern is used to produce an emulated analog waveform. A first step for producing an emulated analog waveform is to modulate the bit pattern. The modulation may comprise conventional techniques such as phase shift keying (PSK) and/or quadrature amplitude modulation (QAM), as shown at a step 208. Other comparable modulation techniques used in modems can be employed, as would be apparent to a person skilled in the relevant art.

The waveform produced by the modulated bit pattern is then digitized via pulse-code modulation (PCM) to form a digital "image" of an acoustic waveform that can be transmitted on a voice circuit path via D/A conversion (e.g., across an operational telephone line). Generation of the acoustic waveform is shown at a step 210. A copy of this "ideal" digital image of the acoustic waveform is also stored in the database. Storage of the ideal acoustic waveform is shown generally at 212. This step need not be repeated each time an acoustic waveform is transmitted.

The acoustic waveform is transmitted, along with a synchronization signal, to destination acoustic receiver/recorder (106), as shown generally at 214. The transmitted acoustic waveform is then received and recorded, as a digital file in the same format as the ideal waveform in the database shown generally at a step 216. The transmission of the acoustic waveform is accomplished using conventional signal processing and transmission techniques as exemplified by the telephone quality measure system (TQMS) disclosed in U.S. Pat. No. 5,448,624 to Hardy et al. (the '624 patent). Modifications to the TQMS to carry-out the present invention would be apparent to a person skilled in the relevant art. The '624 patent is therefore incorporated herein by reference in its entirety.

A copy of the PCM image of the received acoustic waveform is stored at the destination acoustic receiver/recorder 106, as shown generally at a step 218. The PCM image of the received acoustic waveform is demodulated to extract the semantic content, as shown generally at a step 220. Finally, the received semantic content is stored for later comparison, as shown generally at a step 222.

The processing of the acoustic waveforms is illustrated in FIG. 3. The received semantic content 222 is compared to the transmitted semantic content 206, as shown generally at a comparison step 302. The comparison 302 generates two sets of results. The first set of results includes error bit patterns 304, representing segments of the semantic content that were not accurately transmitted. The second set of results 306 includes segments of the PCM image of the received waveforms corresponding to the error bit patterns 304. In other words, the comparison step 302 correlates sections of the received acoustic waveforms with the segments of the bit pattern that were transmitted with errors.

Each segment 306 is isolated at a step 308. A copy of the corresponding segment of the ideal acoustic waveform 310 is retrieved from the database 104 and is digitally compared to the isolated segment, as shown at a step 312. The corresponding segment of the ideal acoustic waveform is identified using the synchronization signal. The results of the comparison 312 are sorted and stored according to particular circuit characteristics identified by the type of distortion that caused the error. These distortions are recognized as differences between the ideal and the received acoustic waveform according to empirical and/or theoretical analysis, as would be apparent to a person skilled in the relevant art. This sorting is shown at a step 314. According to the comparison 312 and the sorting 314, expected error rates can be projected as a function of the modulation scheme used for transmission of the acoustic waveform, as well as the circuit parameters of the operational telephone line. The prediction of error rates for each error pattern 304 is shown generally at a step 316.

As an example of the final error prediction step 319, consider errors caused by impulse noise spikes on an operational telephone line. If the mean and variance of the impulse noise on an operational telephone line are known, the error rate for a given modulation scheme can be predicted with a high degree of accuracy according to the present invention. In other words, as described above, the system and method of the present invention can be used to determine a correlation (i.e., a statistical mean and variance) of particular semantic bit errors that result from impulse spikes based, for example, on their magnitude and frequency of occurrence. With this information the error rate can be predicted a priori for a path with a given level of impulse spike noise.

Figure 4:
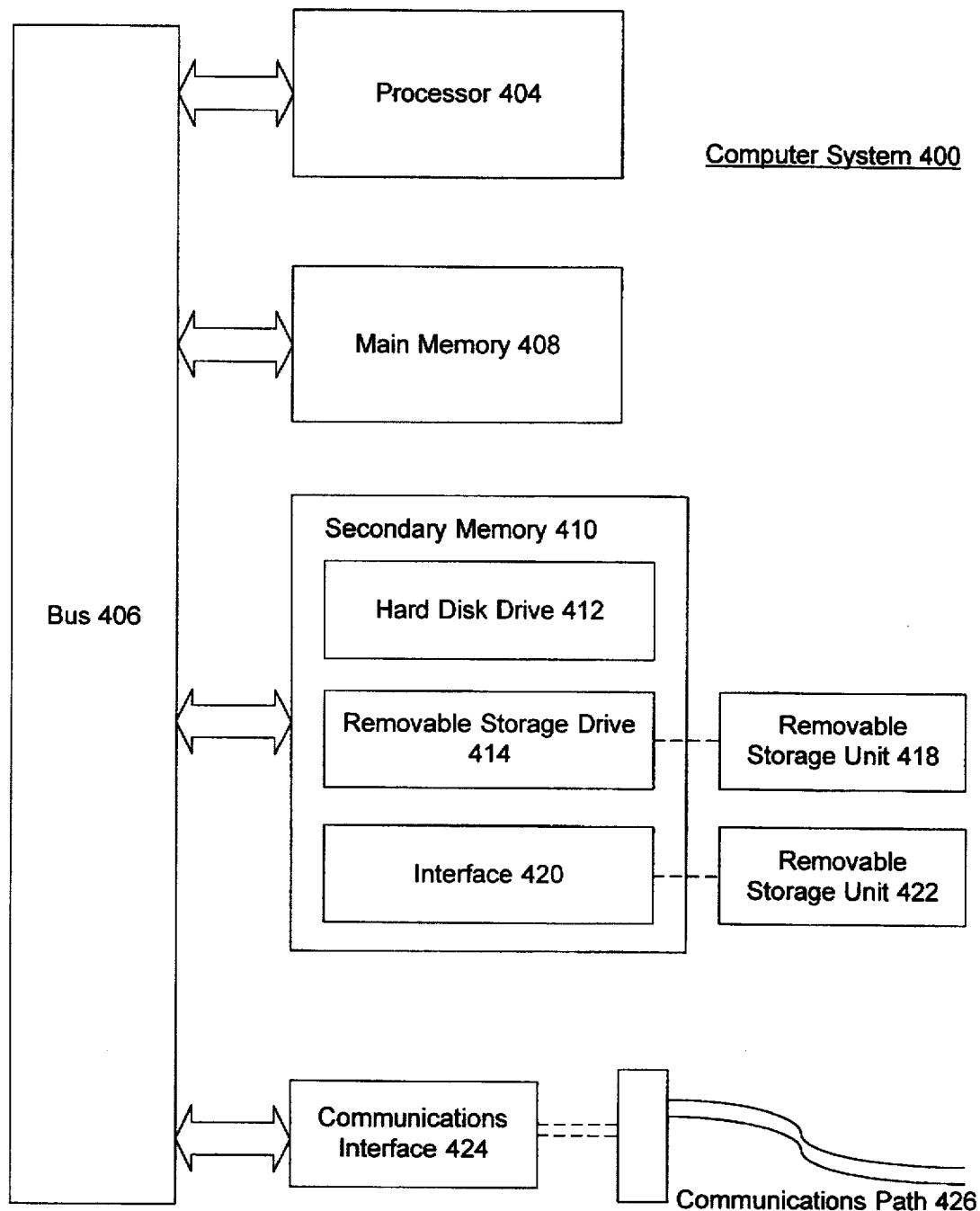
FIG. 4 is a block diagram showing an example environment to implement the present invention.

An alternative environment in which the TQMS system can implement the invention is shown FIG. 4. The environment is a computer system 400 that includes one or more processors, such as processor 404. The processor 404 is connected to a communications bus 406. Various software embodiments are described in terms of this example computer system. After reading this description, it will be apparent to a person skilled in the relevant art how to implement the invention using other computer systems and/or computer architectures. Computer system 400 can be used at either or both ends of the operational telephone line 108 to implement modem emulator 102, receiver/recorder 106 and/or comparator 110.

Computer system 400 also includes a main memory 408, preferably random access memory (RAM), and can also include a secondary memory 440. The secondary memory 440 can include, for example, a hard disk drive 442 and/or a removable storage drive 414, representing a floppy disk drive, a magnetic tape drive, an optical disk drive, etc. The removable storage drive 414 reads from and/or writes to a removable storage unit 418 in a well known manner. Removable storage unit 418 represents a floppy disk, magnetic tape, optical disk, etc., which is read by and written to by removable storage drive 414. As will be appreciated, the removable storage unit 418 includes a computer usable storage medium having stored therein computer software and/or data.

In alternative embodiments, secondary memory 440 may include other similar means for allowing computer programs or other instructions to be loaded into computer system 400. Such means can include, for example, a removable storage unit 422 and an interface 420. Examples can include a program cartridge and cartridge interface, a removable memory chip (such as an EPROM, PROM, or PCMCIA) and associated socket, and other removable storage units 422 and interfaces 420 which allow software and data to be transferred from the removable storage unit 422 to computer system 400. Any of the aforementioned memory devices can be used to implement database 104.

Computer system 400 can also include a communications interface 424. Communications interface 424 allows software and data to be transferred between computer system 400 and external devices via communications path 426. Examples of communications interface 424 can include a modem, a network interface (such as an ethernet card), a communications port, etc. Software and data transferred via communications interface 424 are in the form of signals that can be electronic, electromagnetic, optical or other signals capable of being received by communications interface 424 via communications path 426. Note that communications interface 424 provides a means by which computer system 400 can interface to a network such as the Internet.

The present invention is described in terms of this example environment and the patented TQMS. Description in these terms is provided for convenience only. It is not intended that the invention be limited to application in this example environments. In fact, after reading the following description, it will become apparent to a person skilled in the relevant art how to implement the invention in alternative environments.

Moreover, the present invention is preferably implemented using software running (that is, executing) in an environment similar to that described above with respect to FIG. 4. In this document, the term "computer program product" is used to generally refer to removable storage device 418 or a hard disk installed in hard disk drive 442. These computer program products are means for providing software to computer system 400.

Computer programs (also called computer control logic) are stored in main memory and/or secondary memory 440. Computer programs can also be received via communications interface 424. Such computer programs, when executed, enable the computer system 400 to perform the features of the present invention as discussed herein. In particular, the computer programs, when executed, enable the processor 404 to perform the features of the present invention. Accordingly, such computer programs represent controllers of the computer system 400.

In an embodiment where the invention is implemented using software, the software may be stored in a computer program product and loaded into computer system 400 using removable storage drive 414, hard drive 442 or communications interface 424. Alternatively, the computer program product may be downloaded to computer system 400 over communications path 426. The control logic (software), when executed by the processor 404, causes the processor 404 to perform the functions of the invention as described herein.

In another embodiment, the invention is implemented primarily in hardware using, for example, hardware components such as application specific integrated circuits (ASICs). Implementation of a hardware state machine so as to perform the functions described herein will be apparent to persons skilled in the relevant art(s).

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for testing acoustic modem signals, comprising the steps of:

(1) producing an acoustic waveform representing a semantically encoded Modem waveform;

(2) transmitting said acoustic waveform over an operational telephone line to a destination location;

(3) recording said transmitted acoustic waveform at said destination location;

(4) accessing an ideal acoustic waveform; and (5) comparing said recorded acoustic waveform with said ideal acoustic waveform to determine whether a transmission error has occurred, wherein said transmission error is associated with at least one circuit component of the operational telephone line.

2. The method of claim 1, further comprising the steps of:

(6) determining a semantic bit error; and (7) isolating a segment of said recorded acoustic waveform that corresponds to said semantic bit error.

3. The method of claim 2, wherein said step of comparing further comprises the step of identifying waveform distortions of said segment of said recorded acoustic waveform.

4. The method of claim 3, further comprising the step of characterizing said waveform distortions with circuit components of the operational telephone line.

5. A computer program product for permitting a computer system to test acoustic modem signals, said computer program product comprising:

a computer usable medium having computer readable program code means embodied in said medium for causing an application program to execute on the computer system, said computer readable program code means comprising:

a computer readable first program code means for causing the computer system to produce an acoustic waveform representing a semantically encoded modem waveform;

a computer readable second program code means for causing the computer system to transmit said acoustic waveform over an operational telephone line to a destination location;

a computer readable third program code means for causing the computer system to record said transmitted acoustic waveform at said destination location;

a computer readable fourth program code means for causing the computer system to access an ideal acoustic waveform; and a computer readable fifth program code means for causing the computer system to compare said recorded acoustic waveform with said ideal acoustic waveform to determine whether a transmission error has occurred, and further causing the computer system to associate said transmission error with at least one circuit component of the operational telephone line.

6. The computer program product of claim 5, wherein said computer readable program code means further comprises:

a computer readable sixth program code means for causing the computer system to determine a semantic bit error; and a computer readable seventh program code means for causing the computer system to isolating a segment of said recorded acoustic waveform that corresponds to said semantic bit error.

7. The computer program product of claim 6, wherein said computer readable program code means further comprises:

a computer readable eighth program code means for causing the computer system to identify waveform distortions of said segment of said recorded acoustic waveform.

8. The computer program product of claim 7, wherein said computer readable program code means further comprises:

a computer readable ninth program code means for causing the computer system to characterize said waveform distortions with circuit components of the operational telephone line.

9. The method of claim 2, further comprising the step of comparing said isolated segment of said recorded acoustic waveform with a corresponding segment of said ideal acoustic waveform.

10. The computer program product of claim 5, wherein said computer readable program codes means further comprises:

a computer readable tenth program code means for causing the computer system to compare said isolated segment of said recorded acoustic waveform with a corresponding segment of said ideal acoustic waveform.

* * * * *